(12) United States Patent
Schulze (10) Patent No.: US 8,328,479 B2
(45) Date of Patent: Dec. 11, 2012

(54) SELF-LOCKING, OVERRIDEABLE AND ATTENUATING CARGO GUIDE AND RESTRAINT

(75) Inventor: Greg Schulze, Jamestown, ND (US)

(73) Assignee: Goodrich Corporation, Charlotte, NC (US)

( * ) Notice: Subject to any disclaimer, the term of this patent is extended or adjusted under 35 U.S.C. 154(b) by 21 days.

(21) Appl. No.: 13/111,538

(22) Filed: May 19, 2011

(65) Prior Publication Data
US 2011/0217138 A1 Sep. 8, 2011

Related U.S. Application Data

(62) Division of application No. 12/371,993, filed on Feb. 17, 2009, now Pat. No. 7,988,391.

(51) Int. Cl.
*B60P 7/08* (2006.01)

(52) U.S. Cl. .............. 410/80; 410/77; 410/92; 410/69

(58) Field of Classification Search ............ 410/80, 410/77–79, 69, 94, 92, 74, 75; 414/536; 244/118.1, 137.1; 248/500, 503
See application file for complete search history.

(56) References Cited

U.S. PATENT DOCUMENTS

| | | | |
|---|---|---|---|
| 3,377,040 A | 4/1968 | Hansen | |
| 3,796,397 A | 3/1974 | Alberti | |
| 3,906,870 A | 9/1975 | Alberti | |
| 3,933,101 A | 1/1976 | Blas | |
| 3,986,460 A | 10/1976 | Voigt | |
| 4,331,412 A | 5/1982 | Graf | |
| 4,696,609 A | 9/1987 | Cole | |
| 5,112,173 A | 5/1992 | Eilenstein | |
| 5,265,991 A | 11/1993 | Herrick | |
| 5,316,242 A | 5/1994 | Eilenstein-Wiegmann | |
| 5,433,564 A | 7/1995 | Sundseth | |
| 5,573,359 A | 11/1996 | Moradians | |
| 5,618,139 A | 4/1997 | Graf | |
| 6,039,519 A | 3/2000 | Jones | |
| 6,270,300 B1 | 8/2001 | Huber | |
| 6,450,744 B1 | 9/2002 | Gilhuys | |
| 6,485,238 B2 | 11/2002 | Segura | |
| 6,729,818 B1 | 5/2004 | Yee | |
| 6,896,456 B2 | 5/2005 | Huber | |
| 7,429,157 B2 | 9/2008 | Schulze | |
| 7,435,043 B2 | 10/2008 | Brekken | |
| 7,530,774 B2 | 5/2009 | Roberts | |
| 7,665,938 B2 | 2/2010 | Schulze | |
| 7,854,579 B2 | 12/2010 | Roberts | |
| 7,988,391 B2 * | 8/2011 | Schulze | ............ 410/80 |
| 2009/0016838 A1 * | 1/2009 | Roberts | ............ 410/69 |

* cited by examiner

*Primary Examiner* — Stephen Gordon
(74) *Attorney, Agent, or Firm* — Womble Carlyle Sandridge & Rice, LLP (57) ABSTRACT

An aircraft cargo restraint has a base configured for attachment to a cargo deck. A housing is rotatably mounted to the base about a first axis and is movable between an erect position and a stowed position. A head is movably disposed in the housing, and is movable between an extended position and a contracted position in directions that are substantially parallel to the first axis. The restraint includes a lock configured to releasably secure the housing in the erect position when the head is in the contracted position, and to permit movement of the head from the erect position to the stowed position when the head is in the extended position.

9 Claims, 15 Drawing Sheets

FIG. 16

SELF-LOCKING, OVERRIDEABLE AND ATTENUATING CARGO GUIDE AND RESTRAINT

CROSS-REFERENCE TO RELATED APPLICATIONS

The present application is a divisional of U.S. application Ser. No. 12/371,993, filed Feb. 17, 2009 now U.S. Pat. No. 7,988,391, which is incorporated herein by reference in its entirety and for all purposes.

FIELD OF THE INVENTION

The invention relates to cargo restraints for aircraft, and more specifically relates to an overrideable and attenuating guide and vertical restraint that adapts to varying cargo floor displacements and automatically locks in an erect position when engaged by a compatible cargo container.

BACKGROUND OF THE INVENTION

Figure 1:
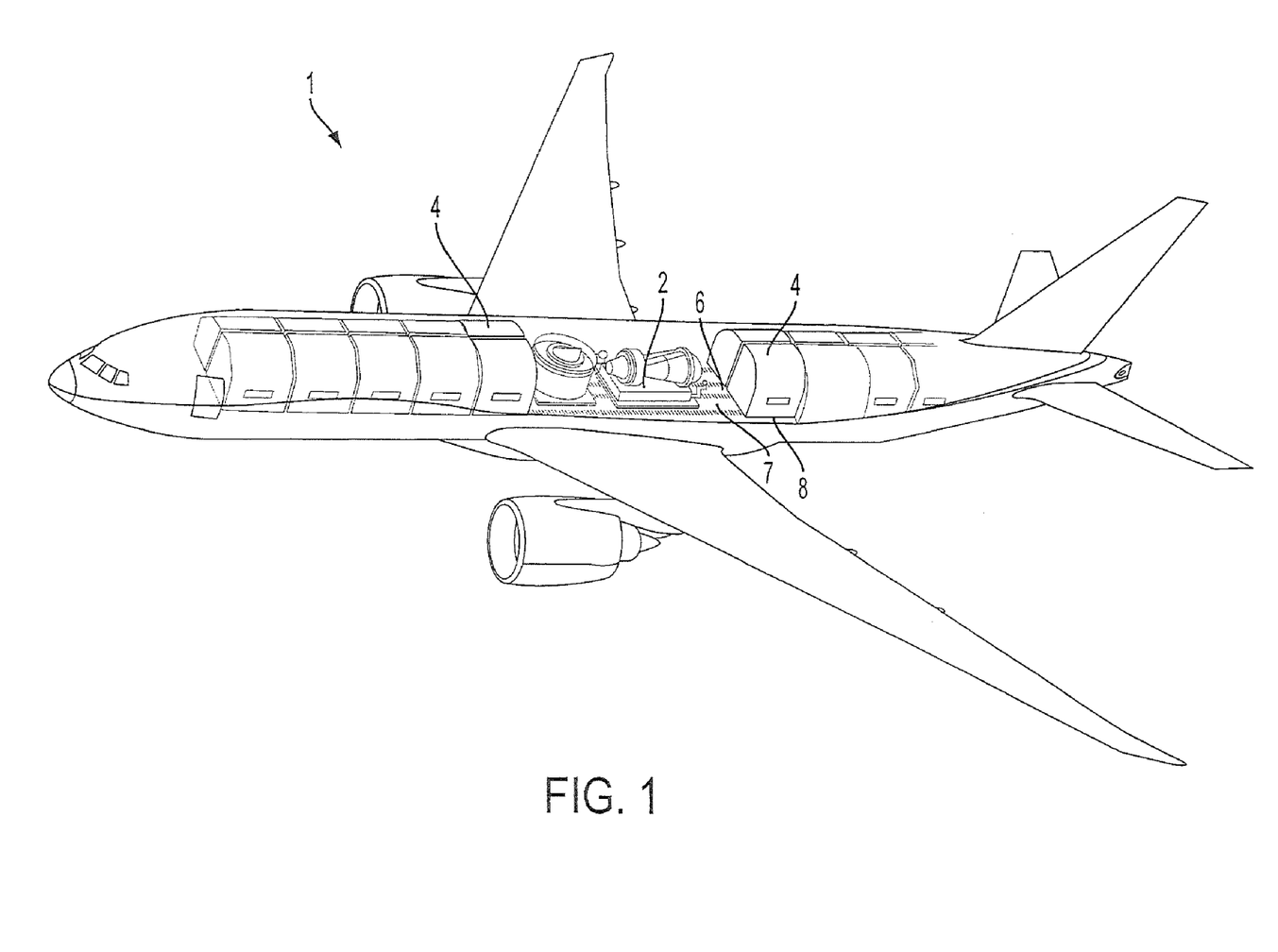
FIG. 1 is a perspective view of an aircraft showing various types of cargo stowed within the aircraft's cargo compartment.

As shown in FIG. 1, commercial aircraft 1 typically carry cargo on pallets 2 and in large containers called unit load devices (ULDs) 4. Standardized ULDs 4 and pallets 2 are available iii several different configurations having different lengths and widths. All ULDs 4 and pallets 2 must be securely retained during flight to prevent damage to the aircraft 1 and the cargo and to maintain aircraft stability and balance during flight. Accordingly, various types of restraint devices are used to laterally and vertically restrain ULDs 4 and pallets 2 in their stowed positions within an aircraft's cargo compartments. Such restraining devices are typically mounted to an aircraft's cargo deck structure 7 at fixed points that correspond to the lower edges of stowed ULDs 4 and pallets 2. Based upon the particular types and sizes of ULDs 4 and pallets 2 to be stowed onboard an aircraft, the positions of the restraint devices on the aircraft's cargo deck 7 can vary.

In some cases, multiple restraint devices are installed at points that will accommodate various combinations of ULD and pallet types and sizes. For example, centerline restraints can be positioned along the longitudinal centerline 6 of a cargo deck 7, and side restraints can be positioned in rows that are parallel to and at various distances from the centerline 6, including along the sidewall 8 of a cargo compartment. For a ULD 4 that is about half as wide as an aircraft's cargo hold, a ULD 4 can be loaded and stowed such that an inboard lower edge of the ULD 4 is vertically and laterally restrained by one or more centerline restraints positioned along the aircraft's centerline 6, and an opposed exterior lower edge of the ULD 4 is vertically and laterally restrained by one or more side restraints positioned adjacent to the aircraft's sidewall 8. For a wide ULD 4 or pallet 2 that is stowed along an aircraft's centerline 6, opposed lower outboard edges of the ULD 4 or pallet 2 can be vertically and laterally restrained by opposed sets of side restraints positioned adjacent to the aircraft's opposed sidewalls 8, for example.

Various types of restraint devices have been developed to accommodate various cargo configurations and to facilitate cargo loading and unloading. For example, some restraint devices are designed to be manually retracted to a stowed position when not used for a particular load configuration such that the devices will not interfere with the loading and unloading of ULDs. Some restraint devices also are overrideable such that they automatically retract to a stowed position when contacted and overridden by a ULD as the ULD is being moved along a cargo deck. Vertical cargo restraint devices typically include restraint heads that extend over a protruding lip or edge along the base of a ULD, thus blocking upward displacement of the ULD. Because restraint devices are typically positioned along the edges of cargo lanes that define rows of stowed ULDs, such restraints can also function to guide ULDs along these lanes as the ULDs are moved along a cargo deck during loading and unloading. These restraints can also block lateral movement of stowed ULDs.

Figure 2A:
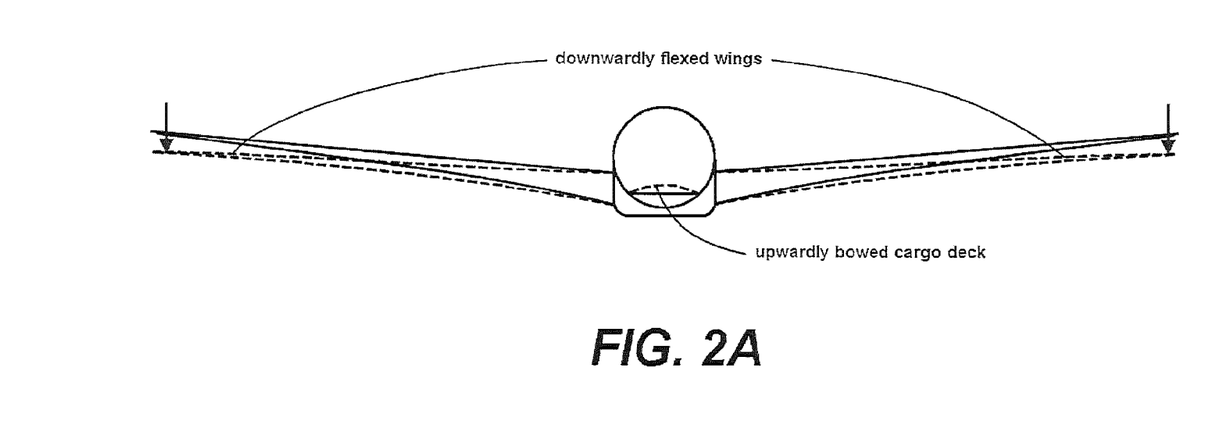
FIG. 2A is a schematic diagram of an aircraft illustrating an effect that downward wing flexure can have on an aircraft's deck structure.

In some aircraft, flexing of the aircraft's wings during flight can causes temporary changes to the aircraft's cargo deck structure, particularly in the area of the aircraft's wing box. For example, as shown in FIG. 2A, downward flexure of an aircraft's wings can cause upward bowing of the aircraft's cargo deck structure. In an extreme case, this upward bowing can cause outboard side vertical restraints attached to the cargo deck to temporarily pull away and possibly disengage from their associated ULDs.

Figure 2B:
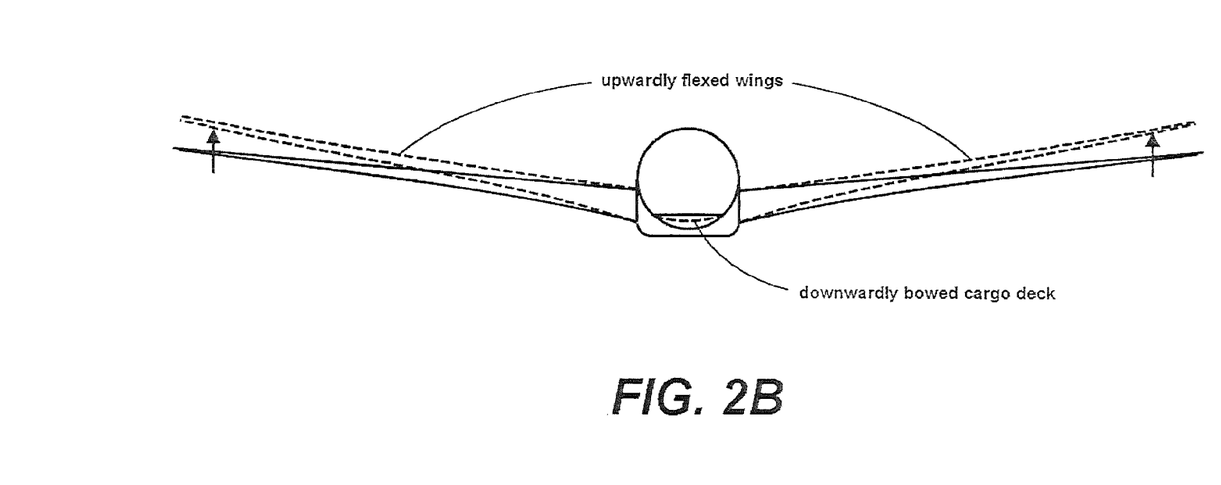
FIG. 2B is a schematic diagram of an aircraft illustrating an effect that upward wing flexure can have on an aircraft's deck structure.

Conversely, as shown in FIG. 2B, upward flexure of an aircraft's wings can cause downward bowing of an aircraft's cargo deck structure. Such downward bowing of the cargo deck can cause stowed ULDs to be squeezed between their restraints, and can result in substantial lateral loads on the restraint devices. In an extreme case, such lateral loads on the restraints may overload the aircraft's supporting floor structure.

Typically, cargo restraints are either fixed in their operable upright positions (i.e. not overrideable), or are designed to resiliently retract from their upright positions when overridden by ULDs. A restraint that is fixed in its upright position can be susceptible to damage from contact with a ULD if an operator neglects to retract the restraint when the restraint is not used for a particular cargo load configuration. Overrideable restraints can prevent such damage, but can also be prone to unwanted retraction upon initial contact with a compatible ULD. In such a case, the spring or springs used to upwardly bias the head of an overrideable restraint may be incapable of adequately resisting unwanted retraction of the restraint upon contact with a compatible ULD. Such unwanted retraction of an overrideable restraint can prevent the restraint from guiding the compatible ULD as the ULD traverses an associated cargo lane, and can preclude restraining engagement between the restraint and the compatible ULD. When an active restraint is inadvertently pulled down in this manner due to contact with a compatible ULD, the restraint and/or the ULD can be damaged.

Accordingly, there is a need for a vertical cargo restraint that can accommodate being squeezed against a ULD without transmitting damaging loads to an aircraft's deck structure. In addition, there is a need for a vertical restraint device that will remain engaged with a ULD even as flexure of an associated deck structure acts to pull the restraint away from the ULD. Furthermore, there is a need for an overrideable vertical cargo guide and restraint that will automatically lock in an erect position when the guide and restraint is engaged by a compatibly-sized ULD, and will also automatically retract when overridden by an incompatible ULD.

SUMMARY OF THE INVENTION

One embodiment of the invention includes an aircraft cargo restraint having a base configured for attachment to a cargo deck. A housing can be rotatably mounted to the base about a first axis and can be movable between an erect position and a stowed position. A head can be movably disposed in the housing, and can be movable between an extended position and a contracted position in directions that are substantially parallel to the first axis. The restraint can include a lock that is configured to releasably secure the housing in the erect position when the head is in the contracted position, and to permit movement of the head from the erect position to the stowed position when the head is in the extended position.

In another embodiment, an overrideable side cargo restraint for an aircraft can include a base and a head movably connected to the base. The head can be movable between an erect position and a stowed position and can be movable between an inboard position and an outboard position when in the erect position. At least one pin on the head can align with an opening in the base when the head is in the erect position and can be at least partially received in the opening in the base when the head is in both the erect position and the outboard position. The pin can block movement of the head from the erect position to the stowed position.

In a further embodiment, an apparatus for at least partially restraining a unit load device on an aircraft can include a base and a head movably connected to the base. The head can be positionable in an erect position and in a stowed position. When the head is in an erect position and is not engaged with a unit load device, the head can be substantially free to move from the erect position to the stowed position. When the head is in an erect position and is engaged with a cargo container, the head can be prevented from moving from the erect position to the stowed position.

These and other aspects and features of the invention will be understood from a reading of the following written description together with the appended drawings.

DETAILED DESCRIPTION OF THE PREFERRED EMBODIMENTS

Figure 3:
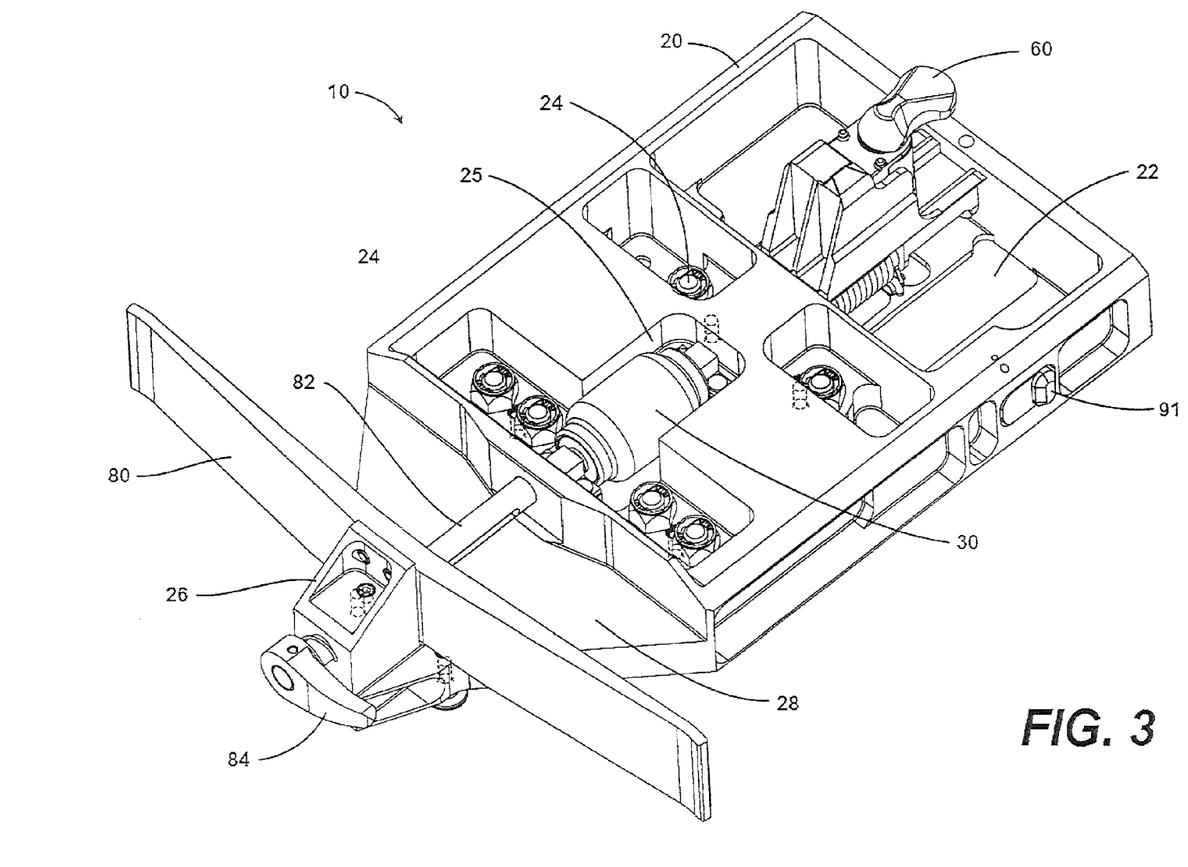
FIG. 3 is a top perspective view of one embodiment of a vertical restraint assembly according to the invention.
Figure 4:
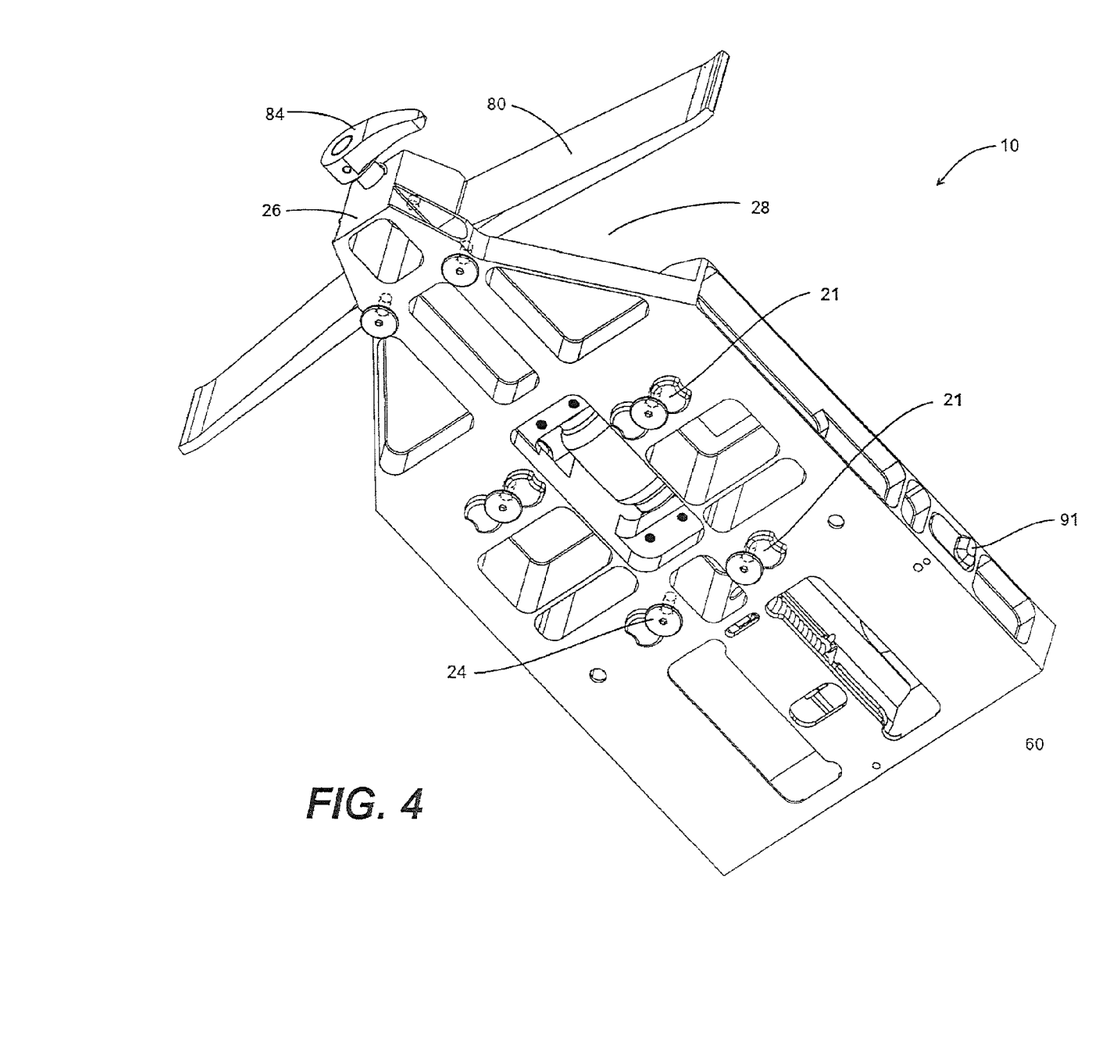
FIG. 4 is a bottom perspective view of one embodiment of a vertical restraint assembly according to the invention.
Figure 5:
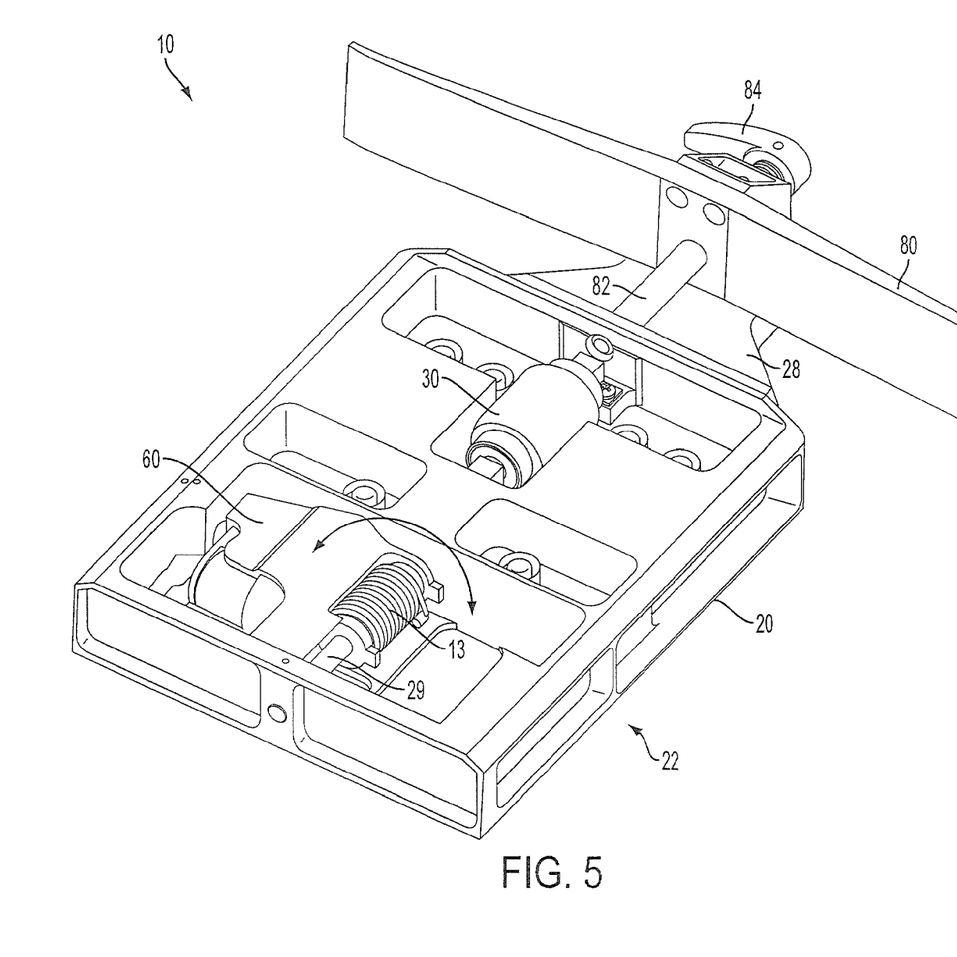
FIG. 5 is a top perspective view of one embodiment of a vertical restraint assembly according to the invention with its head assembly in a stowed position.

One embodiment of a guide and restraint assembly 10 is generally shown in FIGS. 3-5. The restraint assembly 10 shown and described herein is a side restraint configured to be installed along a cargo deck proximate to a sidewall of a cargo compartment of an aircraft. As shown in FIG. 3, the assembly 10 can include a base 20 having a first cavity 22. A head assembly 60 can be pivotally or otherwise mounted in the first cavity 22. The assembly 10 can also include a roller 30 rotatably mounted in a second cavity 25 in the base. The base 20 can further include a heel 26. A leaf spring 80 can be positioned adjacent to the heel 26, and can combine with the base 20 to define a rail channel 28 therebetween. A rail pin 82 having a handle 84 can extend through the heel 26 and leaf spring 80 and across the channel 28. As shown in FIG. 4, the base 20 can include a plurality of sheer plungers 21 and studs 24 for mounting the assembly 10 along conventional aircraft seat tracks in a manner known in the art.

As can be seen by comparing FIGS. 3 and 5, the head assembly 60 is movable between the erect position shown in FIG. 3 and a stowed or overridden position shown in FIG. 5. As indicated by the bi-directional arrow in FIG. 5, the head assembly 60 can rotate in either direction from its erect position, and therefore can be overridden by a ULD traveling in either of two opposite directions. When the head assembly 60 is in the erect position, the head assembly 60 extends above an associated cargo plane (see FIG. 12). As shown in FIG. 5, when the head assembly 60 is in a stowed or overridden position, the head assembly is received within the first cavity 22 of the base 30. In the stowed position, the head assembly 60 is positioned below an associated cargo plane. As shown in FIG. 5, the head assembly 60 can pivot about a shaft 29 that extends across the first cavity 22. A torsion spring 13 can be provided to bias the head assembly 60 toward the erect position shown in FIG. 3. As shown in FIGS. 3 and 4, a latch 91 of a type known in the art can be provided for releasably securing the head assembly 60 in a stowed position.

Figure 6:
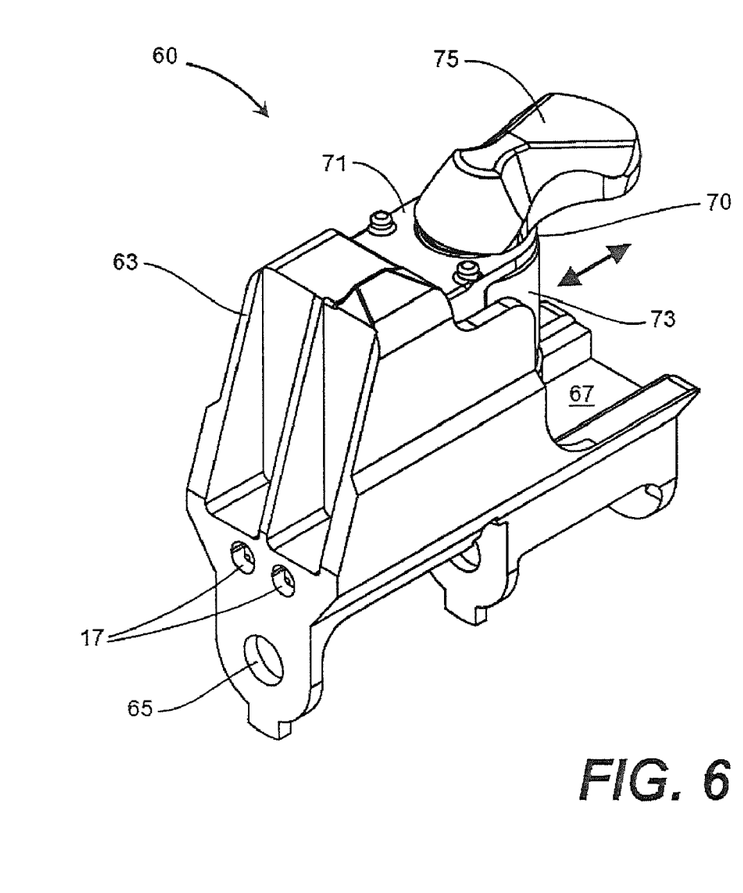
FIG. 6 is a perspective view of one embodiment of a head assembly portion of the vertical restraint assembly shown in FIGS. 3-5.
Figure 7:
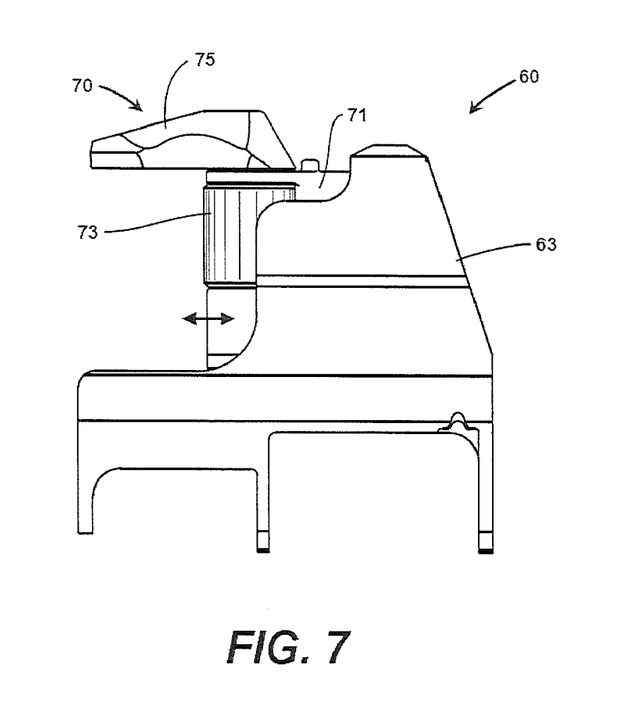
FIG. 7 is a side elevation view of the head assembly shown in FIG. 6.
Figure 8:
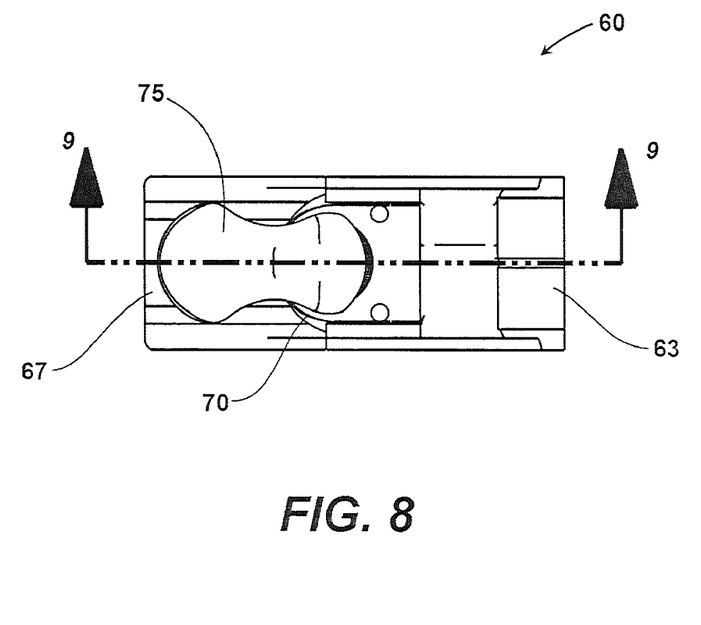
FIG. 8 is a top plan view of the head assembly shown in FIGS. 6-7.
Figure 9:
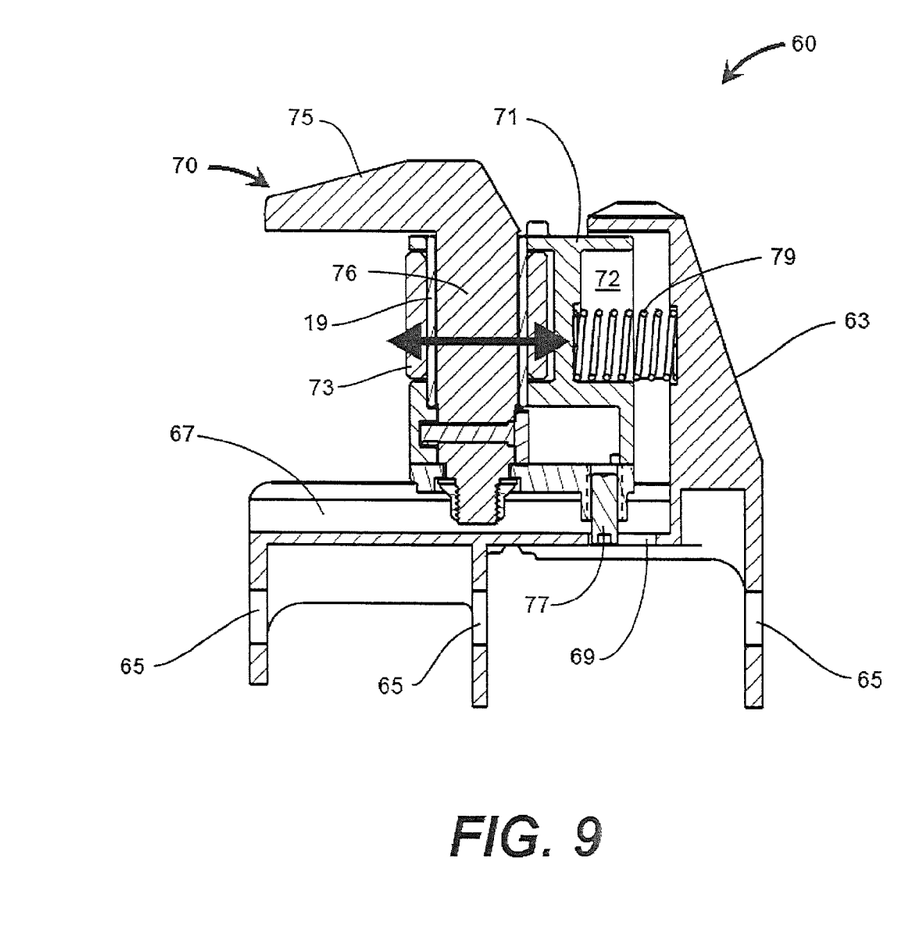
FIG. 9 is a cross-section of a head assembly taken along line 9-9 in FIG. 8.

One embodiment of a head assembly 60 is shown in FIGS. 6-9. As shown in FIG. 6, the head assembly 60 can include a housing 63 and a head 70. The housing 63 can include one or more holes 65 for receiving the shaft 29 (shown in FIG. 5) such that the housing 63 can rotate about the shaft 29. The housing 63 can include a slide channel 67, and the head 70 can be slidably disposed in the slide channel 67. Accordingly, the head 70 can translate in the channel relative to the housing 63 as indicated by the bi-directional arrow in FIG. 6. As shown in FIG. 7, the head 70 can generally include a body 71, a guide roller 73, and a restraint member 75. FIGS. 8 and 9 show how the head 70 can be movably disposed within the housing 63. The body 71 can be configured to slide within the channel 67 in the housing 63 as indicated by the bi-directional arrow in FIG. 9. A slot 69 can be provided in the base of the channel 67 to receive a downwardly extending pin 77 on the head 70. The pin 77 can move in the slot 69 and cooperate with the ends of the slot 69 to establish limits to the sliding movement of the head 70 in the channel 67. A spring 79 can be disposed between the head 70 and the housing 63 to bias the head 70 away from the housing 63. As shown in FIG. 9, the restraint member 75 can include a cylindrical portion 76. The guide roller 73 can be rotatably disposed on the cylindrical portion 76. A bushing 19 can be disposed between the guide roller 73 and the cylindrical portion 76 in order to minimize friction and facilitate free rotation of the guide roller 73.

Figure 10:
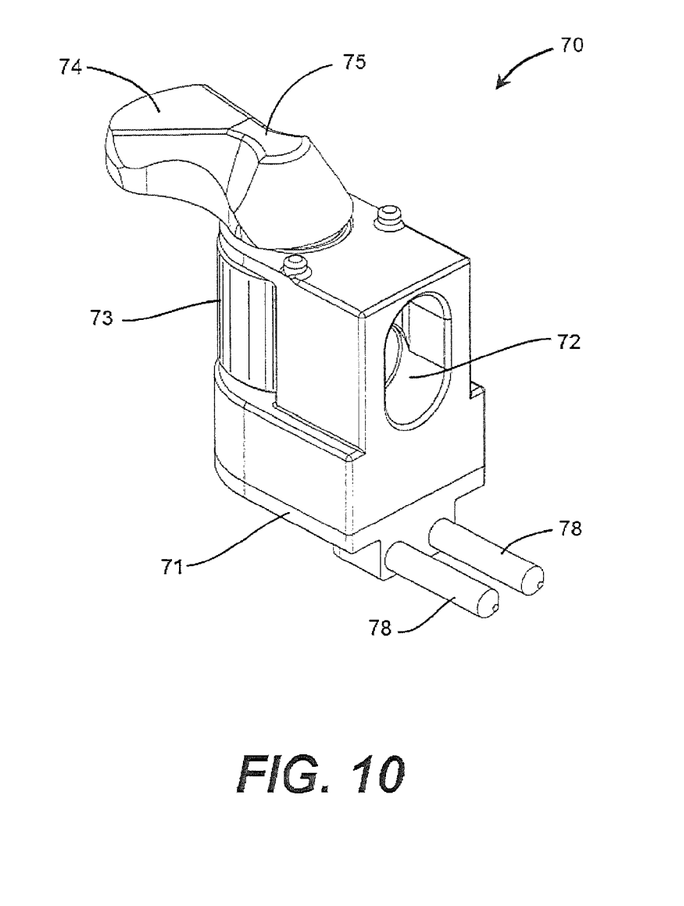
FIG. 10 is a perspective view of a sliding head portion of the head assembly shown in FIGS. 6-9.
Figure 11:
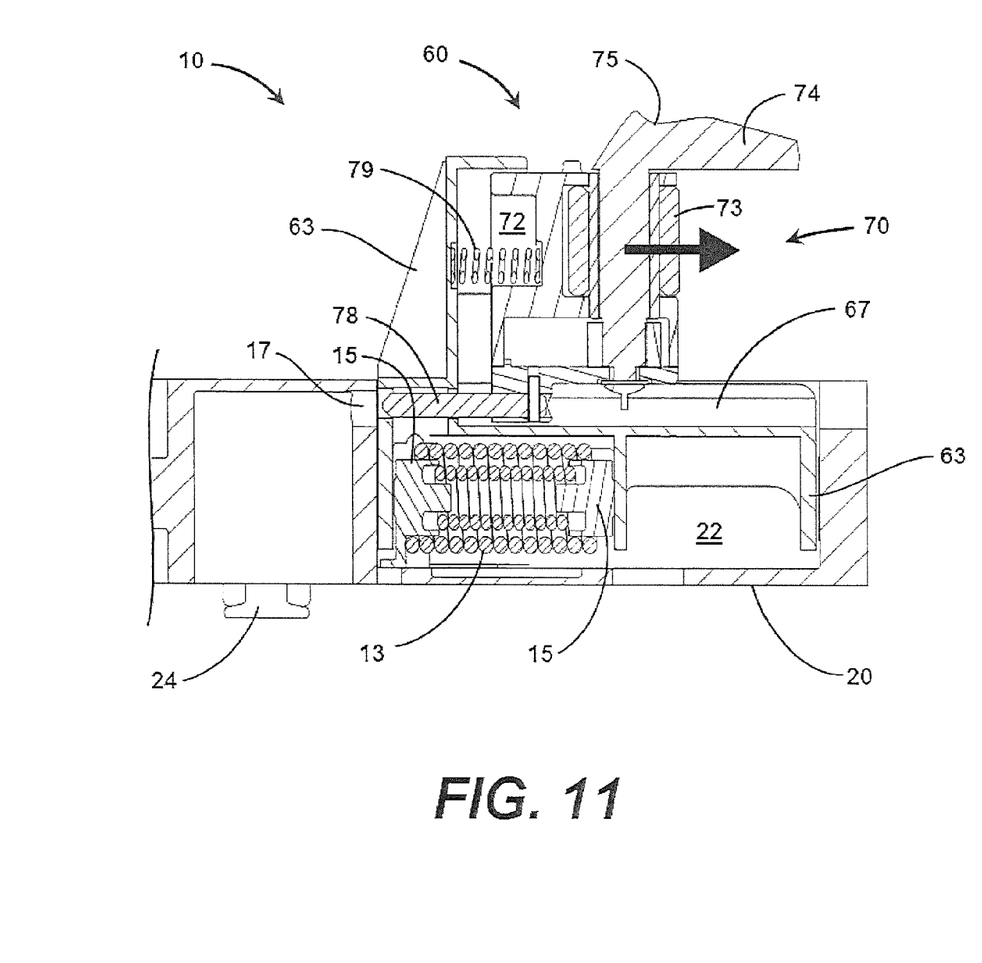
FIG. 11 is a cross sectional view of the head assembly in an unlocked upright position.
Figure 12:
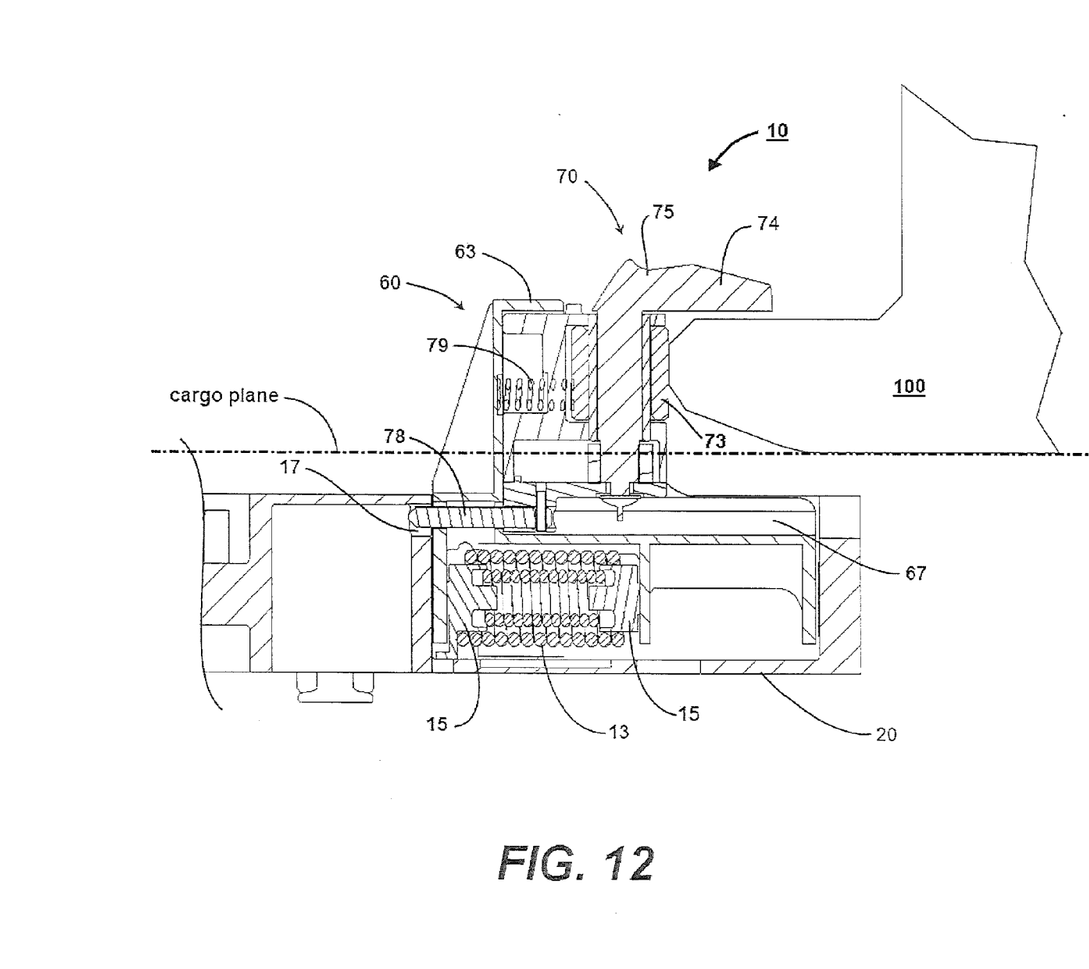
FIG. 12 is a cross sectional view of the head assembly in a locked upright position.

A lock for automatically fixing the head assembly 60 in an active erect position is shown in FIGS. 10-12. As shown in FIG. 10, one or more locking pins 78 can outwardly extend from the body 71. The body 71 can also include a spring cavity 72 for receiving the spring 79 shown in FIG. 9. The outer surface of the roller 73 is substantially exposed except for that portion adjacent to the housing 71. An extended portion 74 on the restraint member 75 extends above and away from the housing 71.

FIG. 11 shows the head 70 in a fully extended position away from the housing 63, as indicated by the directional arrow. This is the free state position of the head 70 when no external loads are applied to the head 70. When the head 70 is urged to the fully extended position by the spring 79, no portion of the locking pin 78 on the head 70 extends into an aligned opening 17 in the base 20. Accordingly, the head assembly 60 is free to rotate between the erect position shown in FIG. 11 and the stowed position shown in FIG. 5. Thus, if an erect head assembly 60 is overridden by a ULD, the head assembly 60 can rotate downwardly until the head assembly 60 is received within the first cavity 22 in the base 20, thereby permitting the overriding ULD to pass over the restraint assembly 10 without substantial obstruction.

FIG. 12 shows the head 70 displaced to a fully contracted position toward the housing 63 such as due to contact with a compatibly sized ULD 100, as indicated by the directional arrow. In this position, the spring 79 is compressed and the locking pin 78 on the head 70 is received in an aligned opening 17 in the base 20. Once engaged in the aligned opening 17, the locking pin prevents the head assembly 60 from rotating away from its erect position. Accordingly, once contact is made with a compatibly sized ULD, the head assembly 60 remains erect and is available to guide the ULD 100 in its cargo lane as the ULD 100 is moved to or from its stowed position. The roller 73 facilitates guided movement of an engaged ULD 100 as the ULD 100 moves relative to the head 70.

Figure 13:
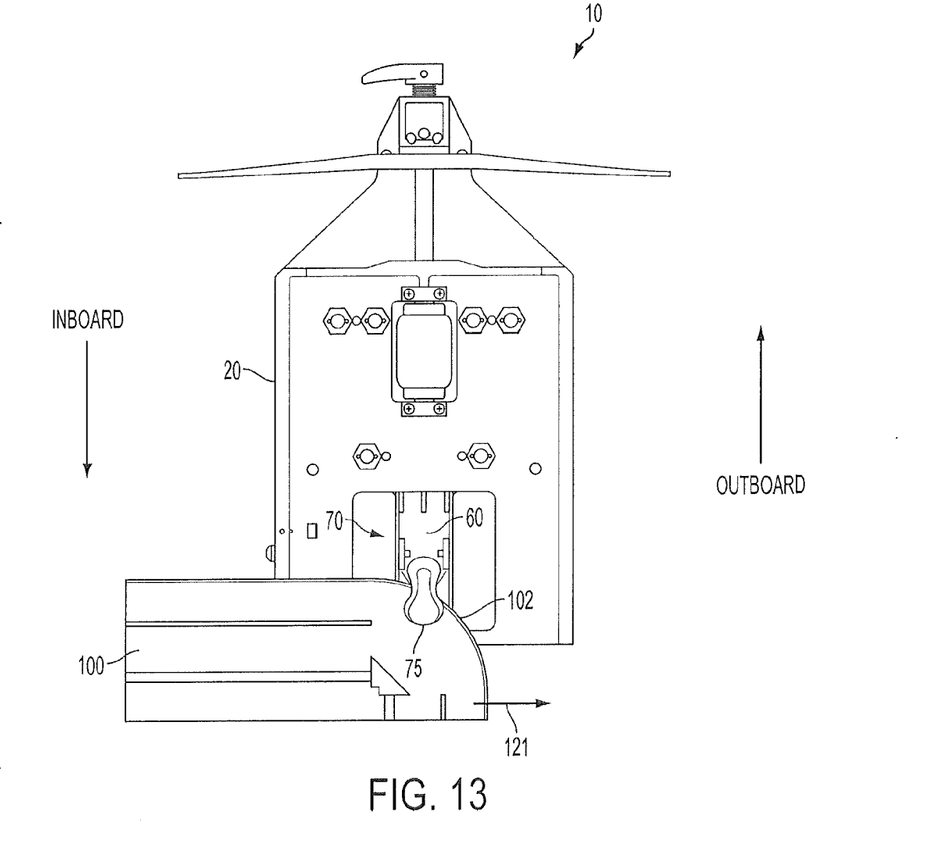
FIG. 13 is a top view of a vertical restraint assembly as the head assembly is encountered by a corner of a translating ULD.

FIG. 13 shows a compatibly sized ULD 100 as the ULD 100 approaches and makes initial contact with the head assembly 60. In FIG. 13, the restraint assembly 10 is stationary, and the ULD is moving in the direction indicated by arrow 121. As initial contact is made between a leading edge 102 of an approaching ULD 100 and the head 70, the head 70 is deflected away from the ULD 100 in an outboard direction that is transverse to the direction of movement 121 of the approaching ULD 100. As shown in FIG. 12, such deflection of the head 70 causes the locking pin 78 to engage the aligned opening 17 in the base 20, thereby locking the head assembly 60 in an erect position and facilitating maintained guiding engagement between the head 75 and the ULD 100.

Figure 14A:
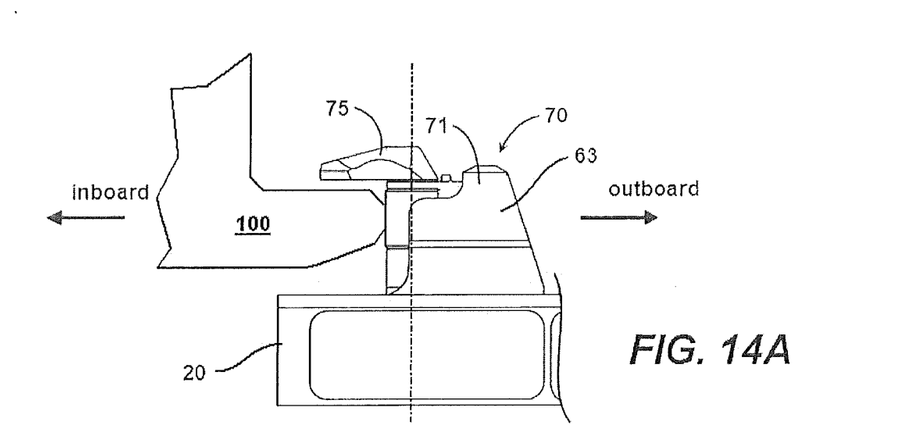
FIGS. 14A-14C are elevation views of a vertical restraint assembly engaged with a ULD under various aircraft flight conditions.
Figure 14B:
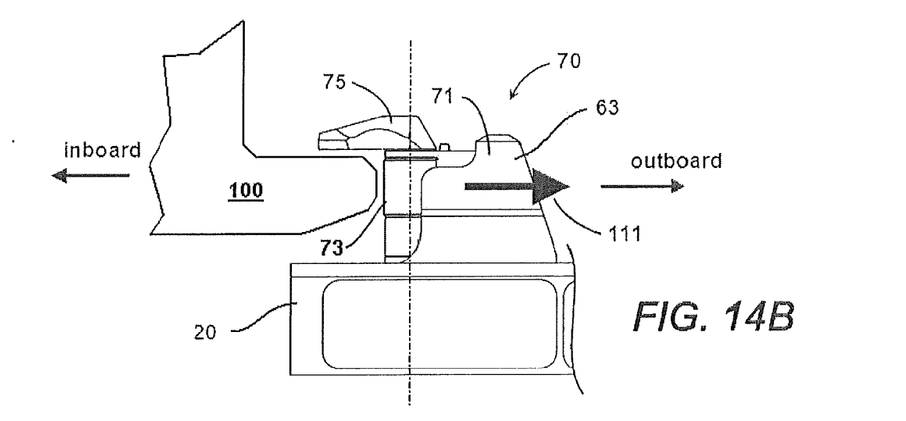
Figure 14C:
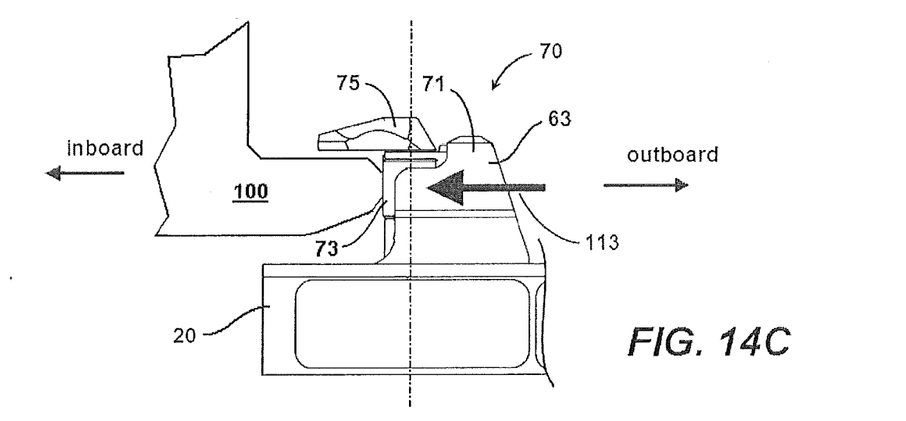

As shown in FIG. 14A, once the head assembly 60 is engaged with a ULD 100, the spring 79 (not shown) biases the head 75 toward the edge of the ULD 100. As shown in FIG. 14B, even if flexure of a cargo deck acts to pull the base 20 and housing 63 of the restraint assembly 10 away from the ULD (as indicated by directional arrow 111), the spring-loaded head 75 is able to attenuate in an opposite direction such that overlap between the head 75 and the ULD 100 and vertical restraint of the ULD 100 is maintained. As shown in FIG. 14B, overlapping engagement of the head 75 with the ULD 100 can be maintained even when contact between the ULD 100 and the roller 73 is lost. In addition and as shown in FIG. 14C, if flexure of a cargo deck acts to push the base 20 and housing 63 toward the ULD 100 (as indicated by directional arrow 113), the spring 79 allows the head 75 to retract within the housing 63 in an opposite direction, thus preventing potentially substantial loads from being transferred through the head 75, housing 63 and base 20 to a supporting floor structure. In addition, one or more of the housing 63, head 75 and associated hardware can be constructed such that one or more of these components resiliently flexes when the spring 79 is fully compressed and the head 75 is fully retracted within the housing 63, thus further minimizing the magnitude of interference-generated loads transferred through the base 20 to a supporting floor structure. In FIGS. 14B and 14C, the extents of the relative displacements between the head 75 and housing 63 are exaggerated for the purpose of illustration.

Figure 15:
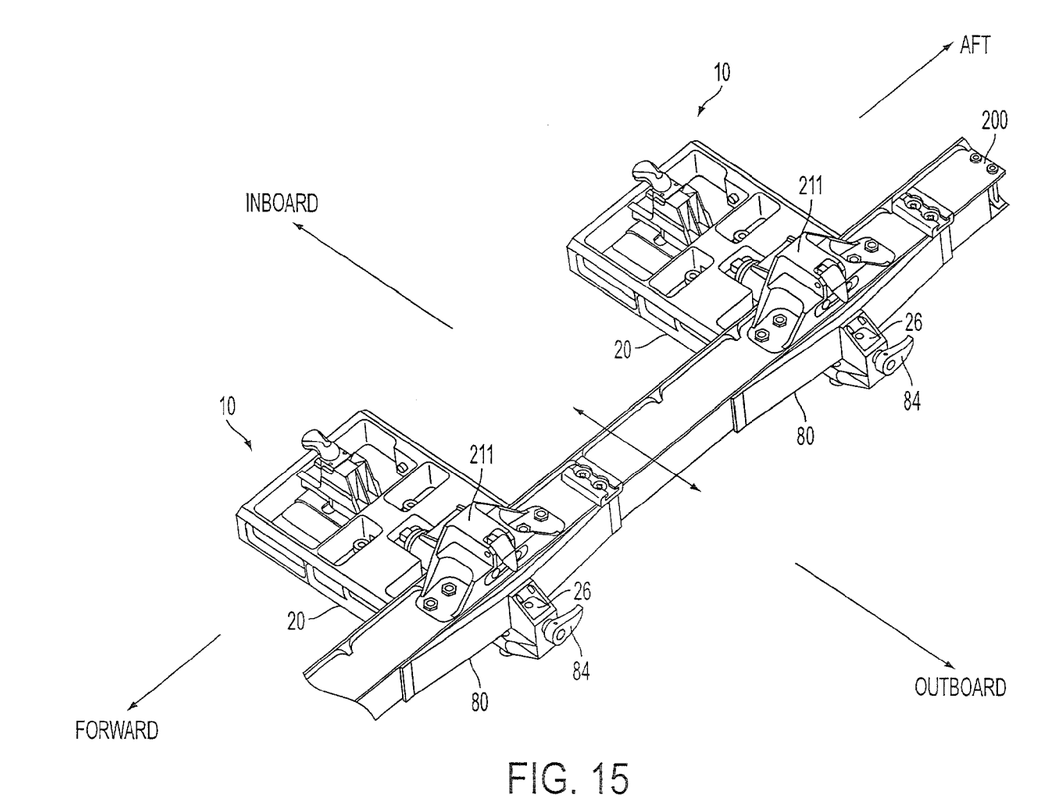
FIG. 15 is a perspective view of a side support rail assembled to a plurality of vertical restraint assemblies.
Figure 16:
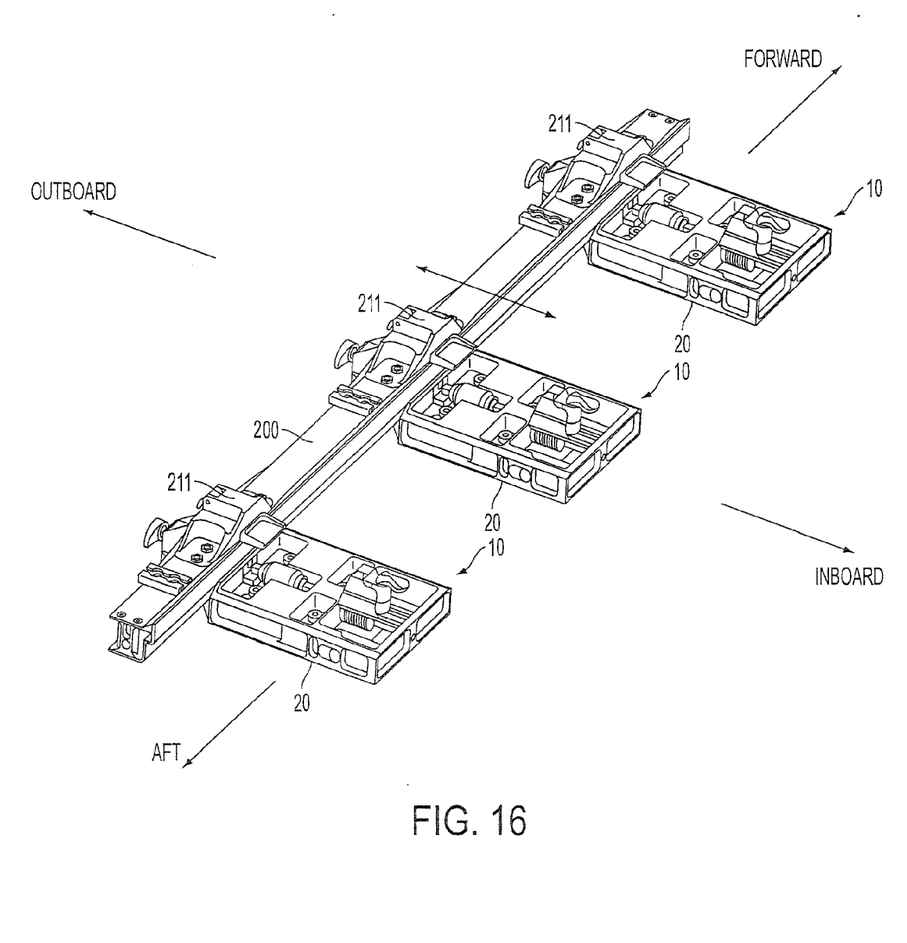
FIG. 16 is another perspective view of the side support rail assembly shown in FIG. 14.

FIGS. 15 and 16 show a side support rail 200 assembled to and between a plurality of retainer assemblies 10. As discussed above, the particular embodiment of the retainer assembly 10 described above is configured to be mounted to a cargo deck proximate to sidewall of a cargo compartment. In order to provide restraints immediately adjacent to such a sidewall, a support rail 200 having a plurality of side restraints 211 can be mounted to and between a series of previously installed restraint assemblies 10. The support rail 200 can be positioned in the rail channels 28 between the bases 20 and the leaf springs 80 of each restraint assembly 10. Rail pins 82 like those shown in FIGS. 3 and 5 can be inserted through the rail 200, thus securing the rail 200 in a substantially fixed position along the sidewall. The leaf springs 80 are configured to bias the rail 200 and side restraints 211 in an inboard direction, and to permit at least some attenuated movement of the guide rail 200 and side restraints 211 under the same types of cargo floor deflections discussed above for the attenuating head 75, as indicated by the bi-directional arrows in FIGS. 15 and 16. Accordingly, the restraint assembly 10 described above can be used to provide restraints at two different positions: an overrideable and attenuated vertical restraint at an inboard position, and an attenuated fixed restraint at an outboard position.

The above descriptions of particular embodiments of the invention are intended to describe various features and aspects of the invention without limiting the invention to the specific embodiments described. Persons of ordinary skill in the art will understand that certain changes and modifications can be made to the described embodiments without departing from the invention. All such changes and modifications are intended to be within the scope of the appended claims.

That which is claimed is:
1. An overrideable side cargo restraint for an aircraft comprising:
 (a) a base;
 (b) a head movably connected to the base, the head being movable between an erect position and a stowed position and being movable between an inboard position and an outboard position when in the erect position; and
 (c) at least one pin on the head that aligns with an opening in the base when the head is in the erect position and is at least partially received in the opening in the base when the head is in both the erect position and the outboard position, thereby blocking movement of the head from the erect position to the stowed position.
2. An aircraft cargo restraint according to claim 1 further comprising a first biasing member that biases the head toward the erect position.

3. An aircraft cargo restraint according to claim 2 further comprising a latch configured to releasably secure the head in the stowed position.

4. An aircraft cargo restraint according to claim 1 further comprising a second biasing member that biases the head toward the inboard position.

5. An aircraft cargo restraint according to claim 1 further comprising a plurality of pins on the head that each align with an associated opening in the base when the head is in the erect position and are at least partially received in their associated openings in the base when the head is in both the erect position and the outboard position, thereby blocking movement of the head from the erect position to the stowed position.

6. An aircraft cargo restraint according to claim 1 further comprising a leaf spring configured to resiliently clamp a support rail to the base.

7. An aircraft cargo restraint according to claim 1 further comprising a side cargo restraint secured to the base.

8. An aircraft cargo restraint according to claim 1 further comprising a roller rotatably mounted to the base.

9. An aircraft cargo restraint according to claim 1 further comprising a roller rotatably disposed on the head.

* * * * *